(12) United States Patent
Dickens et al.

(10) Patent No.: US 11,390,028 B1
(45) Date of Patent: Jul. 19, 2022

(54) METHOD OF FABRICATING MULTIMATERIAL FIBERS FROM LOW DIMENSIONAL MATERIALS

(71) Applicant: Florida A&M University, Tallahassee, FL (US)

(72) Inventors: Tarik J. Dickens, Tallahassee, FL (US); Phong Tran, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 294 days.

(21) Appl. No.: 16/569,183

(22) Filed: Sep. 12, 2019

Related U.S. Application Data

(60) Provisional application No. 62/730,255, filed on Sep. 12, 2018.

(51) Int. Cl.
| | |
|---|---|
| *B29C 64/314* | (2017.01) |
| *B33Y 70/00* | (2020.01) |
| *B33Y 10/00* | (2015.01) |
| *B33Y 40/00* | (2020.01) |
| *B29B 11/06* | (2006.01) |
| *B29C 64/118* | (2017.01) |
| *B29K 105/16* | (2006.01) |
| *B29K 101/12* | (2006.01) |

(52) U.S. Cl.
CPC ............ *B29C 64/314* (2017.08); *B29B 11/06* (2013.01); *B29C 64/118* (2017.08); *B33Y 10/00* (2014.12); *B33Y 40/00* (2014.12); *B33Y 70/00* (2014.12); *B29K 2101/12* (2013.01); *B29K 2105/162* (2013.01)

(58) Field of Classification Search
CPC ..... B29C 70/52; B29C 70/521; B29C 70/305; B29C 64/118; B33Y 70/00; B29B 9/14; B29B 11/16
See application file for complete search history.

(56) References Cited

U.S. PATENT DOCUMENTS

2016/0339633 A1* 11/2016 Stolyarov ............ B29C 48/2665
2018/0010266 A1*  1/2018 Li ......................... D02G 3/367

OTHER PUBLICATIONS

Chang et al., Structural and Functional Fibers. Annu. Rev. Mater. Res. 2017. vol. 47: 331-359.
Tao et al., Multimaterial Fibers. International Journal of Applied Glass Science. 2012. vol. 3 (No. 4): 349-368.

* cited by examiner

*Primary Examiner* — Matthew J Daniels
*Assistant Examiner* — Andrew D Graham
(74) *Attorney, Agent, or Firm* — Smith & Hopen, P.A.; Paul Murty

(57) ABSTRACT

Methods of forming multimaterial fibers via a thermal drawing process used to produce fibers with controlled compositions and alignments. The multimaterial fibers are usable as feedstock for additive manufacturing printing, as well as other applications that require elongated fibers with improved physical characteristics. The multimaterial fibers are formed from a mixture of low dimensional materials (LDM's), such as metal nanoparticles, and thermoplastic matrices. During fabrication of the fibers, a composite of LDM's and thermoplastics is heated and experiences a pulling force on one end in a direction away from an opposing end, thereby drawing the composite into an elongated fiber. The fiber includes a set of physical properties determined by the LDM's, and is usable as a filament across various applications.

17 Claims, 3 Drawing Sheets

METHOD OF FABRICATING MULTIMATERIAL FIBERS FROM LOW DIMENSIONAL MATERIALS

CROSS-REFERENCE TO RELATED APPLICATIONS

This nonprovisional application is a continuation of and claims priority to provisional application No. 62/730,255, entitled "Fabrication of multimaterials fibers with controlled alignment and concentration via thermal drawing," filed Sep. 12, 2018, by the same inventors.

BACKGROUND OF THE INVENTION

1. Field of the Invention

This invention relates, generally, to methods of forming multimaterial fibers. More specifically, it relates to utilizing thermal drawing techniques to form multimaterial fibers made from low dimensional materials for use in additive manufacturing and other manufacturing applications.

2. Brief Description of the Prior Art

Fibers have long been formed by stretching metal, glass, plastic, and other materials by using tensile forces. Such a process, commonly referred to as drawing, results in a strand of material that is stretched thinner to a desired shape and thickness for various applications. For example, additive manufacturing and other manufacturing applications can utilize long fibers as feeder material to manufacture printed items. Similarly, long fibers can be created in the manufacture of semiconductor and polymer nanoparticles, such as those used in biomolecular imaging, electrochemical reactions, and pathogenic bacterial reduction.

While the use of lengthened, or drawn, fibers is known, the costs associated with the production of such fibers is high. Moreover, it is difficult to control the concentration, orientation, and composition of the materials within a fiber, particularly a multimaterial fiber. As such, fibers can not only be prohibitively expensive to produce, but can also exhibit limited physical, chemical, and mechanical properties, such that the fibers have limited usefulness.

Accordingly, what is needed is a method of fabricating multimaterial fibers that can be aligned and controlled to improve the functionality of the produced fibers. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas.

Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for methods of fabricating multimaterial fibers that can be aligned and controlled to improve the functionality of the produced fibers is now met by a new, useful, and nonobvious invention.

The novel method includes combining an amount a low dimensional material with an amount of a thermoplastic material to form a low dimensional material and thermoplastic composite. A low dimensional material may be comprised of metal nanoparticles, semiconductor nanoparticles, or carbon nanoparticles; a thermoplastic material may be comprised of acrylonitrile butadiene styrene, polyactic acid, or polyetherimde. In an embodiment, the low dimensional material and thermoplastic composite is formed by spray coating the amount the low dimensional material onto the amount of the thermoplastic material. Multiple different low dimensional materials can be spray coated on the thermoplastic material by spray coating a first portion of the thermoplastic with a first low dimensional material, and by spray coating a second portion of the thermoplastic with a second, different low dimensional material.

The method includes a step of combining the low dimensional material and thermoplastic composite with a preform having a defined structure. The low dimensional material and thermoplastic composite adopts the defined structure of the preform. In an embodiment, the preform is fabricated by inserting a rod within a tube, or by inserting a plurality of rods within a tube.

The resulting preform and composite is then used to create a fiber via a thermal drawing process. The thermal drawing process includes heating the low dimensional material and thermoplastic composite to soften the composite. After heating the composite, a force is applied on one end of the composite to pull the end in a direction away from an opposing end of the composite, thereby lengthening the composite to form a fiber. By combining the composite with the preform prior to thermally drawing the low dimensional material and thermoplastic composite, the composite is aligned with the preform, such that the fiber exhibits improved control and alignment as compared with traditional drawing methods.

The fiber can be used as a filament in an additive manufacturing machine to create an object made via additive manufacturing. The object created from the fiber includes associated physical properties that are determined by the selected low dimensional materials used to form the low dimensional material and thermoplastic composite.

An object of the invention is to provide improved methods of fabricating multimaterial fibers that can be controlled and aligned, such that the fibers include associated properties that are useful in various applications, such as additive manufacturing applications.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes the formation of multimaterial fibers via a thermal drawing process to produce fibers with controlled compositions and alignments. The multimaterial fibers formed by the methods described herein are usable as feedstock for additive manufacturing printing, as well as directly usable in various applications that require elongated fibers with improved physical characteristics. The multimaterial fibers are formed from a mixture of low dimensional materials (LDM's) and thermoplastic matrices. As used herein, LDM's are materials that include at least one dimension that is similar in size to an atom while exhibiting strong physical properties due to the large surface area to volume ratio of the materials. The LDM's include metal nanorods, such as those formed from gold, silver, nickel, and other metal alloys; semiconductor nanorods; and carbon nanotubes, including graphene. The thermoplastic materials are formed from materials including acrylonitrile butadiene styrene (ABS), polyactic acid (PLA), polyetherimde (PEI), such as those marketed under the trade name ULTEM®, and other polymers and natural materials commonly used in additive manufacturing applications.

Figure 1:
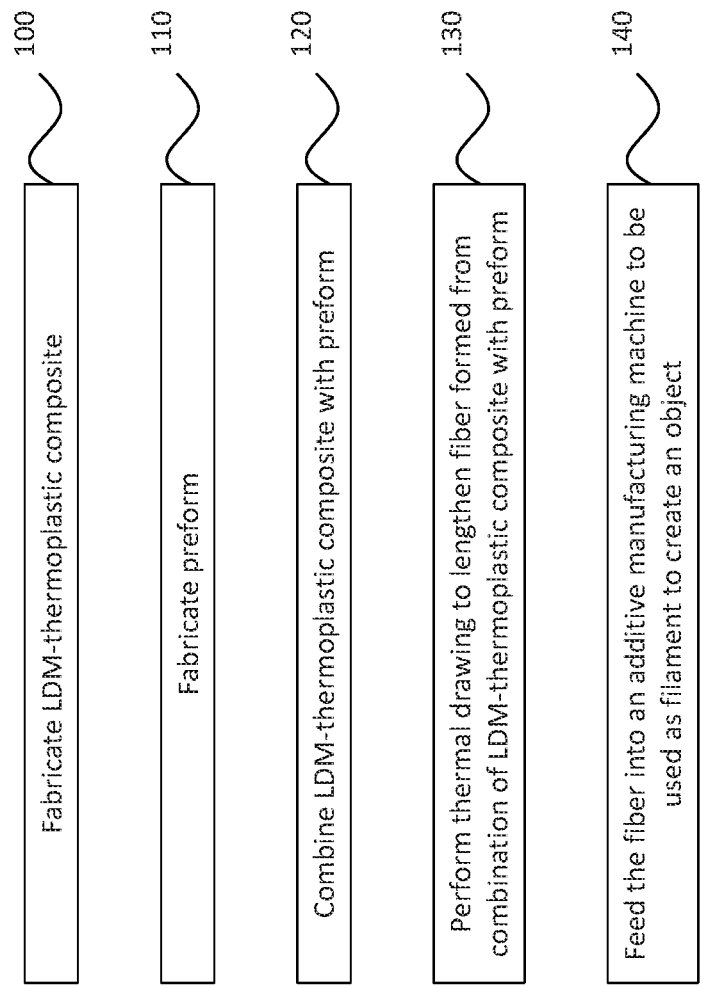
FIG. 1 is a process flow diagram depicting a method of fabricating a fiber from a low dimensional material and thermoplastic composite mixed with a preform material, in accordance with an embodiment of the present invention.

FIG. 1 depicts a process-flow diagram of a method of forming fibers via a thermal drawing process. The method depicted in FIG. 1 represents an embodiment of the present invention, including the formation of fibers including a mixture of one or more LDM's and one or more thermoplastic materials. While FIG. 1 depicts a series of steps, it is appreciated that the method can be performed with additional steps, as well as with fewer steps than depicted in FIG. 1.

As shown in FIG. 1, the method begins at step 100, which includes the fabrication of a LDM-thermoplastic composite at a macroscale or nanoscale. The fabrication step 100 can be performed in a variety of ways. For example, in an embodiment, the one or more LDM's are combined with the one or more thermoplastic materials by dispersing the LDM's onto the thermoplastic material; in another embodiment, the LDM's are spray coated onto a polymer film, particularly to control the concentration of the LDM's and to create multimaterial filament having varying properties depending on the materials comprising the filament. The fabricated composite can then be used in combination with created preform; extruded to create a filament used for 3D printed preforms; drop-cast to form composite films; and other applications.

Figure 2B:
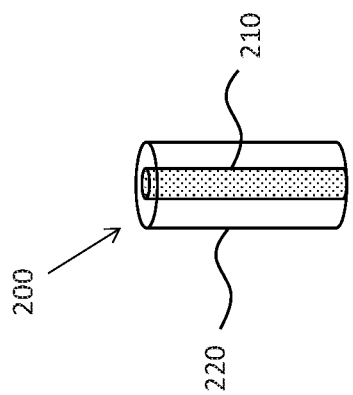
FIG. 2B is an orthogonal view of a preform material usable in the method of FIG. 1.
Figure 2A:
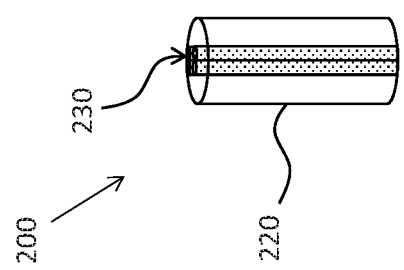
FIG. 2A is an orthogonal view of a preform material usable in the method of FIG. 1.

The method includes a step of fabricating preform during step 110. Preform can be fabricated via a variety of common techniques, such as through a rod-in-tube method (depicted in greater detail in FIG. 2A, showing rod 210 inserted within tube 220 to form preform 200); a stack-and-draw method (depicted in greater detail in FIG. 2B, showing a plurality of rods 230 inserted within tube 220 to form preform 200); an extrusion method; a thin film rolling method; or other typical methods of fabricating preform.

Next, during step 120, the LDM-thermoplastic composite is combined with the fabricated preform to form a pre-fibrous material. Depending on the variety of LDM's and thermoplastics used during step 100, the pre-fibrous material fabricated during step 120 can include multiple materials to create a multimaterial fiber having different properties across the fibrous material.

During step 130 of the method, the pre-fibrous material is lengthened via thermal drawing to form fibers having controllable properties. During step 130, the LDM-thermoplastic composite is heated to soften, such that the composite can be drawn into a fiber by thermal drawing techniques. These thermal drawing techniques include the exertion of a force on one end of the composite to pull the end in a direction away from an opposing end of the composite, thereby stretching and elongating the composite into a fiber. Due to the high viscosity of the melted thermoplastic matrix, a decreased external force is required to transfer the composite into an aligned, rod-like network of fibers. Moreover, by combining the LDM-thermoplastic composite with the preform during the previous step, the pre-fibrous material inherits the structure of the preform prior to being thermally drawn to form a fiber, leading to greater control of the resulting shape and size of the formed fiber. If needed, further treatments can be made to improve the interfacial bonding between the LDM's and polymers for more effective alignment. Moreover, various parameters of the thermal drawing process of step 130 can be altered to form resulting fibers having different properties, such as by varying the speed or temperature at which the drawing is performed.

The resulting fiber has improved physical, chemical, and mechanical performance due to the improved alignment of the thermally-drawn materials. As such, the application of the resulting fiber, such as in an additive manufacturing project as a filament or feedstock (such as the application depicted in step 140, which includes feeding the fiber into an additive manufacturing machine to be used as filament to create an object), achieves greater control and alignment of the materials used to create an additive manufactured object. Moreover, by controlling the concentration and composition of the LDM's used in the creation of resulting fiber, the physical properties of the resulting fiber can be controlled and can vary across the materials used to create the fiber.

Figure 3:
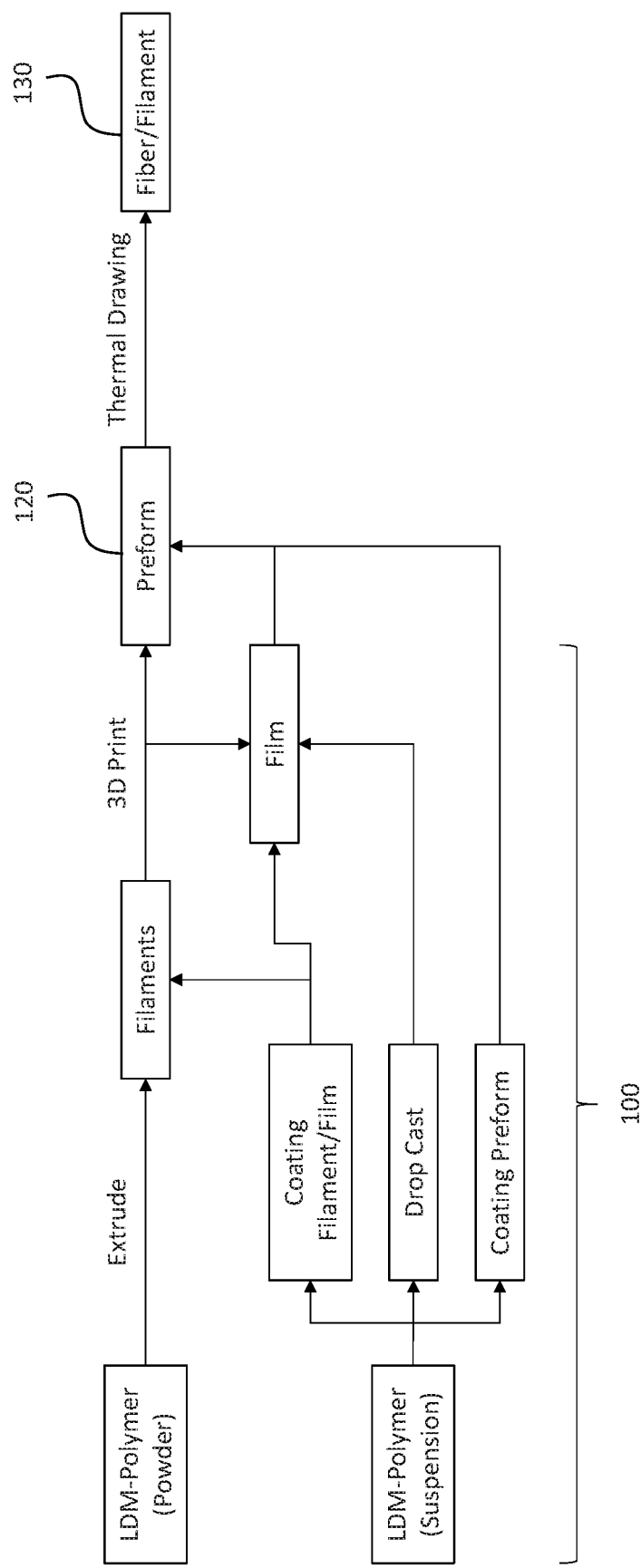
FIG. 3 is a process flow diagram depicting various methods of forming the low dimensional material and thermoplastic composite of the method of FIG. 1, in accordance with an embodiment of the present invention.

As shown in FIG. 3, and as described above, various LDM-thermoplastic composites can be formed and employed in different ways to form the resulting fiber. During step 100, during which the LDM-thermoplastic composite is fabricated, a solid or a liquid LDM-thermoplastic composite can be formed prior to proceeding to the other steps of the method. As shown in FIG. 3, during step 100, the LDM-thermoplastic composite may be formed in a solid, powdered form that can be extruded directly to form filament or preform. Alternatively, during step 100, the LDM-thermoplastic composite may be formed in a liquid suspension. The liquid suspension can be coated onto a filament, a film, or a preform, such as via a spray coating technique. The liquid suspension can also be drop-cast into film to form composite films. By forming the LDM-thermoplastic composite as a suspension, the concentration of the materials within the composite can be controlled. Moreover, by spray coating and masking the composite onto another surface prior to the fabrication of a fiber during step 130, multimaterial fibers can be forms having different properties associated with the various materials included within the fibers.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of fabricating a fiber, the method comprising the steps of:
   combining an amount of a plurality of low dimensional materials with an amount of a thermoplastic material to form a low dimensional material and thermoplastic composite;
   inserting a plurality of rods within a tube to form a preform having a defined structure;
   after forming the low dimensional material and thermoplastic composite, combining the low dimensional material and thermoplastic composite with the preform having the defined structure to form a pre-fibrous structure, such that the low dimensional material and thermoplastic composite adopts the defined structure of the preform, and such that the pre-fibrous structure includes varying physical properties therethrough based on the plurality of low dimensional materials; and
   after forming the pre-fibrous structure including varying physical properties therethrough, thermally drawing the pre-fibrous structure including the low dimensional material and thermoplastic composite with the preform to form a fiber by:
   heating the low dimensional material and thermoplastic composite to soften the composite; and
   applying a force to an end of the low dimensional material and thermoplastic composite to pull the end of the low dimensional material and thermoplastic composite in a direction away from an opposing end, thereby lengthening the low dimensional material and thermoplastic composite to form the fiber,
   wherein by combining the low dimensional material and thermoplastic composite with the preform prior to thermally drawing the low dimensional material and thermoplastic composite, the low dimensional material and thermoplastic composite is aligned with the preform, such that the fiber exhibits improved control and alignment of the varying physical properties, and
   wherein the plurality of low dimensional materials are blended with the thermoplastic composite prior to thermally drawing the pre-fibrous structure, such that the thermally drawn fiber includes the varying physical properties across a length of the fiber.

2. The method of claim 1, wherein the low dimensional material and thermoplastic composite is formed by spray coating the amount of the plurality of low dimensional materials onto the amount of the thermoplastic material.

3. The method of claim 1, further comprising the steps of:
   spray coating a first portion of the amount of the thermoplastic material with a first low dimensional material; and
   spray coating a second portion of the amount of the thermoplastic material with a second low dimensional material, the second low dimensional material being different from the first low dimensional material,
   wherein the fiber is a multimaterial fiber that exhibits associated physical properties of the first low dimensional material at the first portion and associated physical properties of the second low dimensional material at the second portion.

4. The method of claim 1, wherein the plurality of low dimensional materials are selected from the group consisting of metal nanoparticles, semiconductor nanoparticles, and carbon nanoparticles.

5. The method of claim 1, wherein the thermoplastic material is selected from the group consisting of acrylonitrile butadiene styrene, polyactic acid, and polyetherimde.

6. The method of claim 1, further comprising a step of feeding the fiber into an additive manufacturing machine to be used as filament to create an object via an additive manufacturing process.

7. The method of claim 6, wherein the object includes associated physical properties determined by the plurality of low dimensional materials used to form the low dimensional material and thermoplastic composite.

8. A method of fabricating a fiber, the method comprising the steps of:
   combining a plurality of low dimensional materials with a thermoplastic material to form a low dimensional materials and thermoplastic composite;
   inserting a rod within a tube to form a preform having a defined structure;
   after forming the low dimensional materials and thermoplastic composite, combining the low dimensional materials and thermoplastic composite with the preform having the defined structure to form a pre-fibrous structure, such that the low dimensional materials and thermoplastic composite adopts the defined structure of the preform, and such that the pre-fibrous structure includes varying physical properties therethrough based on the plurality of low dimensional materials; and after forming the pre-fibrous structure including varying physical properties therethrough, thermally drawing the pre-fibrous structure including the low dimensional materials and thermoplastic composite with the preform to form a fiber by:
heating the low dimensional materials and thermoplastic composite to soften the composite; and
applying a force to an end of the low dimensional materials and thermoplastic composite to pull the end of the low dimensional materials and thermoplastic composite in a direction away from an opposing end, thereby lengthening the low dimensional materials and thermoplastic composite to form the fiber, wherein by combining the low dimensional materials and thermoplastic composite with the preform prior to thermally drawing the low dimensional materials and thermoplastic composite, the low dimensional materials and thermoplastic composite is aligned with the preform, such that the fiber exhibits improved control and alignment of the varying physical properties, and wherein the plurality of low dimensional materials are blended with the thermoplastic composite prior to thermally drawing the pre-fibrous structure, such that the thermally drawn fiber includes the varying physical properties across a length of the fiber.

9. The method of claim 8, wherein the low dimensional materials and thermoplastic composite is formed by spray coating each of the plurality of low dimensional materials onto the thermoplastic material.

10. The method of claim 9, further comprising the steps of:
spray coating a first portion of the thermoplastic material with one of the plurality of low dimensional materials;
spray coating a second portion of the thermoplastic material with another of the plurality of low dimensional materials, the second low dimensional material being different from the first low dimensional material,
wherein the fiber is a multimaterial fiber that exhibits associated physical properties of the first low dimensional material at the first portion and associated physical properties of the second low dimensional material at the second portion.

11. The method of claim 8, wherein the plurality of low dimensional materials includes at least one material selected from the group consisting of metal nanoparticles, semiconductor nanoparticles, and carbon nanoparticles.

12. The method of claim 8, wherein the thermoplastic material is selected from the group consisting of acrylonitrile butadiene styrene, polyactic acid, and polyetherimde.

13. The method of claim 8, further comprising a step of feeding the fiber into an additive manufacturing machine to be used as filament to create an object via an additive manufacturing process.

14. The method of claim 13, wherein the object includes associated physical properties determined by the plurality of low dimensional materials used to form the low dimensional materials and thermoplastic composite.

15. A method of creating an object via additive manufacturing, the method comprising the steps of:
combining an amount of a plurality of low dimensional materials with an amount of a thermoplastic material to form a low dimensional material and thermoplastic composite, the composite formed by spray coating the amount of the plurality of low dimensional materials onto the amount of the thermoplastic material;
after forming the low dimensional material and thermoplastic composite, combining the low dimensional material and thermoplastic composite with a preform having a defined structure to form a pre-fibrous structure, such that the low dimensional material and thermoplastic composite adopts the defined structure of the preform, and such that the pre-fibrous structure includes varying physical properties therethrough based on the plurality of low dimensional materials;
after forming the pre-fibrous structure including varying physical properties therethrough, thermally drawing the pre-fibrous structure including the low dimensional material and thermoplastic composite with the preform to form a fiber by:
heating the low dimensional material and thermoplastic composite to soften the composite; and
applying a force to an end of the low dimensional material and thermoplastic composite to pull the end of the low dimensional material and thermoplastic composite in a direction away from an opposing end, thereby lengthening the low dimensional material and thermoplastic composite to form the fiber,
wherein by combining the low dimensional material and thermoplastic composite with the preform prior to thermally drawing the low dimensional material and thermoplastic composite, the low dimensional material and thermoplastic composite is aligned with the preform, such that the fiber exhibits improved control and alignment of the varying physical properties, and
wherein the plurality of low dimensional materials are blended with the thermoplastic composite prior to thermally drawing the pre-fibrous structure, such that the thermally drawn fiber includes the varying physical properties across a length of the fiber;
feeding the fiber into an additive manufacturing machine to be used as filament to create an object; and
printing the object using the fiber as filament, such that the object includes associated physical properties determined by the one or more low dimensional materials used to form the low dimensional material and thermoplastic composite.

16. The method of claim 15, further comprising the steps of:
spray coating a first portion of the amount of the thermoplastic material with a first low dimensional material; and
spray coating a second portion of the amount of the thermoplastic material with a second low dimensional material, the second low dimensional material being different from the first low dimensional material,
wherein the fiber is a multimaterial fiber that exhibits associated physical properties of the first low dimensional material at the first portion and associated physical properties of the second low dimensional material at the second portion.

17. The method of claim 15, wherein the plurality of low dimensional materials includes at least one material selected from the group consisting of metal nanoparticles, semiconductor nanoparticles, and carbon nanoparticles.

\* \* \* \* \*